(12) United States Patent
Saarinen et al.

(10) Patent No.: US 10,533,928 B2
(45) Date of Patent: Jan. 14, 2020

(54) PREDICTION OF REMAINING USEFUL LIFETIME FOR BEARINGS

(71) Applicant: ABB Schweiz AG, Baden (CH)

(72) Inventors: Kari Saarinen, Västerås (SE); Shiva Sander-Tavallaey, Täby (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/340,944

(22) PCT Filed: Oct. 6, 2017

(86) PCT No.: PCT/EP2017/075522
§ 371 (c)(1),
(2) Date: Apr. 10, 2019

(87) PCT Pub. No.: WO2018/069189
PCT Pub. Date: Apr. 19, 2018

(65) Prior Publication Data
US 2019/0226944 A1  Jul. 25, 2019

(30) Foreign Application Priority Data
Oct. 11, 2016 (EP) .................................... 16193177

(51) Int. Cl.
G01M 13/04 (2019.01)

(52) U.S. Cl.
CPC .................................. *G01M 13/04* (2013.01)

(58) Field of Classification Search
CPC .................................................... G01M 13/04
USPC .......................................................... 73/593
See application file for complete search history.

(56) References Cited

U.S. PATENT DOCUMENTS

| | | | |
|---|---|---|---|
| 5,210,704 A * | 5/1993 | Husseiny | G01H 1/003 702/34 |
| 6,225,807 B1 * | 5/2001 | Pohl | H01H 1/0015 324/423 |
| 7,457,785 B1 * | 11/2008 | Greitzer | G01D 1/18 706/12 |
| 8,103,463 B2 * | 1/2012 | Kalgren | G01D 3/08 702/117 |
| 8,903,750 B1 | 12/2014 | Bodkin et al. | |

(Continued)

FOREIGN PATENT DOCUMENTS

| CN | 105300692 A | 2/2016 |
|---|---|---|
| EP | 1510805 A1 | 3/2005 |

(Continued)

OTHER PUBLICATIONS

European Search Report Application No. EP 16 19 3177 completed: Apr. 11, 2017; dated Apr. 21, 2017 8 pages.

(Continued)

*Primary Examiner* — Jacques M Saint Surin
(74) *Attorney, Agent, or Firm* — Whitmyer IP Group LLC

(57) ABSTRACT

There is provided mechanisms for predicting remaining useful lifetime of a bearing of an electric podded azimuth thruster. A method is performed by a controller. The method includes obtaining operational conditions of the bearing. The method includes predicting the remaining useful lifetime of the bearing using the operational conditions. The lifetime of the bearing is divided in three separate phases. The remaining useful lifetime of the bearing is predicted differently in the three separate phases.

15 Claims, 6 Drawing Sheets

(56) References Cited

U.S. PATENT DOCUMENTS

| | | | |
|---|---|---|---|
| 9,279,715 B2* | 3/2016 | Hedin | G01M 13/045 |
| 9,360,393 B2* | 6/2016 | Poon | F03B 15/00 |
| 9,964,467 B2* | 5/2018 | Haye | G01M 13/045 |
| 2007/0277613 A1 | 12/2007 | Iwatsubo et al. | |
| 2010/0127892 A1* | 5/2010 | Wesselink | H04Q 9/00 |
| | | | 340/870.07 |
| 2011/0040495 A1 | 2/2011 | El-Refaie et al. | |
| 2015/0254382 A1 | 9/2015 | Bolander et al. | |
| 2015/0262060 A1 | 9/2015 | Husain et al. | |
| 2016/0195453 A1* | 7/2016 | Erskine | G01M 13/04 |
| | | | 73/865.8 |
| 2019/0113081 A1* | 4/2019 | Higashiyama | F16C 19/02 |

FOREIGN PATENT DOCUMENTS

| | | |
|---|---|---|
| WO | 2005095919 A1 | 10/2005 |
| WO | 2013160053 A1 | 10/2013 |

OTHER PUBLICATIONS

International Preliminary Report on Patentability Application No. PCT/EP2017/075522 dated Aug. 31, 2018 6 pages.

International Search Report and Written Opinion of the International Searching Authority Application No. PCT/EP2017/075522 Completed: Dec. 6, 2017; dated Dec. 13, 2017 11 pages.

Wahyu, Caesarendra et al: "Combination of probability approach and support vector machine towards machine health prognostics", Probalistic Engineering Mechanics, Computational Mechanics Publications, Southampton, FR, vol. 26, No. 2, published Sep. 20, 2010, pp. 165-173.

European Office Action Application No. 16193177.9 Completed: Jun. 14, 2019 5 Pages.

* cited by examiner

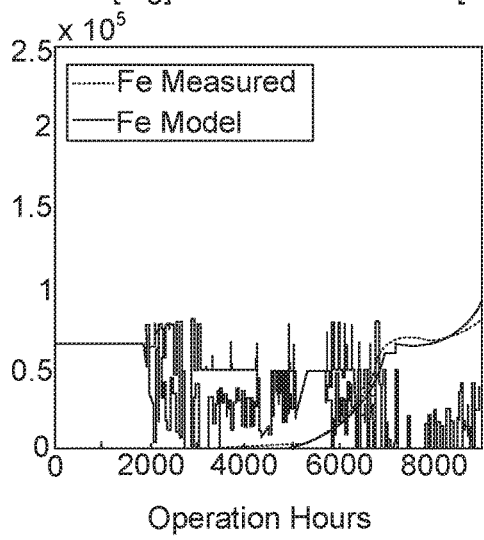
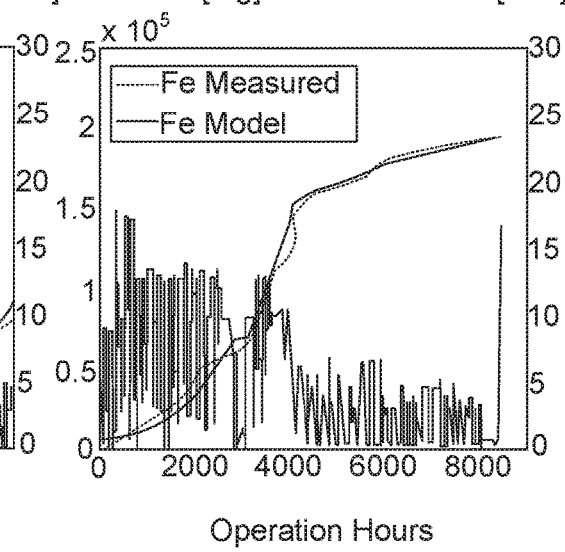
Fig. 7A
Fig. 7B
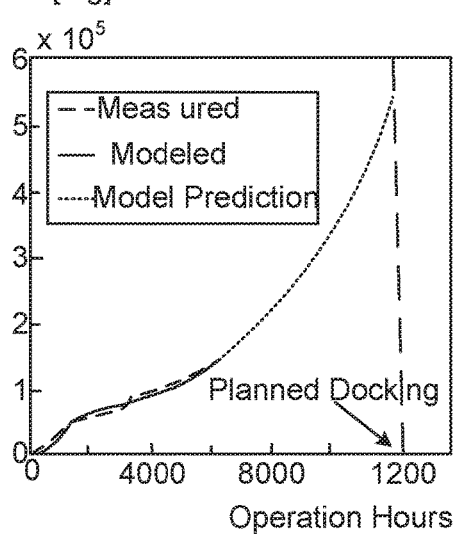
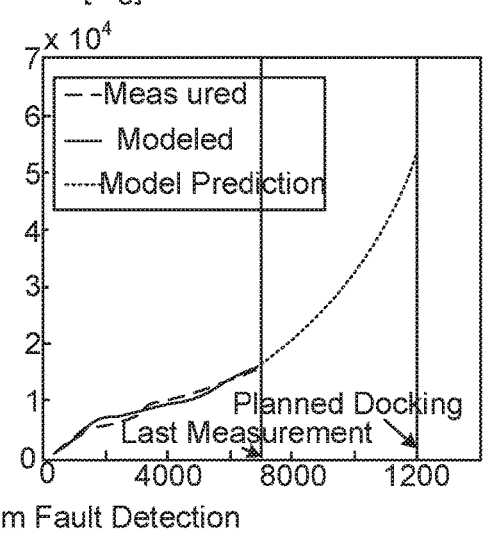
Fig. 8A
Fig. 8B

PREDICTION OF REMAINING USEFUL LIFETIME FOR BEARINGS

TECHNICAL FIELD

Embodiments presented herein relate to a method, a controller, a computer program, and a computer program product for predicting remaining useful lifetime of a bearing.

BACKGROUND

In general terms, an electric podded azimuth thruster is a marine propulsion unit consisting of a fixed pitch propeller mounted on a steerable gondola ("pod") which also contains the electric motor driving the propeller. The podded azimuth thruster thus combines the action of a rudder, thruster and propeller into one revolving propulsion unit. In the podded azimuth thruster unit, the electric motor is mounted inside the propulsion unit and the propeller is connected directly to the motor shaft. By avoiding the use of a traditional propeller shaft, the propeller can be further below the stern of the ship in a clear flow of water, thereby providing greater hydrodynamic and mechanical efficiency. Furthermore, it increases flexibility in the general arrangement of the vessel's power plant. Electric power for the propulsion motor is conducted through slip rings that let the podded azimuth thruster unit rotate 360 degrees about the vertical axis. Because podded azimuth thruster units utilize fixed-pitch propellers, power is always fed through a variable-frequency drive or cycloconverter that allows speed and direction control of the propulsion motors.

From propulsion product availability performance point of view it is seen in history that shaft line bearings have the highest criticality importance factor of unscheduled dry-dockings. This means that in case of a ship needing to be dry docked due to propulsion product related damage, most likely the propulsion product related damage is caused by shaft line bearing failure. Thus, it is crucial to maintain operating context of bearings according to given maintenance instructions as well as to operate propulsion product based on given guidelines. In addition, predictive maintenance can be required to maximize likelihood to survive until the next scheduled dry docking, especially in case bearing damage occurred. Today this problem is solved using data from different sources, analyzed based mainly on expertise knowledge and recommendations by means of continuous as well as scheduled monitoring of bearing by several manual and automatic methods. Such monitoring can be cumbersome to perform and it could thus be difficult to accurately predict the remaining useful lifetime (RUL) of the podded azimuth thruster bearing.

Hence, there is still a need for an improved prediction of remaining useful lifetime of a bearing.

SUMMARY

An object of embodiments herein is to provide efficient and accurate prediction of remaining useful lifetime of a bearing.

According to a first aspect there is presented a method for predicting remaining useful lifetime of a bearing of an electric podded azimuth thruster. The method is performed by a controller. The method comprises obtaining operational conditions of the bearing. The method comprises predicting the remaining useful lifetime of the bearing using the operational conditions. The lifetime of the bearing is divided in three separate phases. The remaining useful lifetime of the bearing is predicted differently in the three separate phases.

According to a second aspect there is presented a controller for predicting remaining useful lifetime of a bearing of an electric podded azimuth thruster. The controller comprises processing circuitry. The processing circuitry is configured to cause the controller to obtain operational conditions of the bearing. The processing circuitry is configured to cause the controller to predict the remaining useful lifetime of the bearing using the operational conditions. The lifetime of the bearing is divided in three separate phases. The remaining useful lifetime of the bearing is predicted differently in the three separate phases.

According to a third aspect there is presented a controller for predicting remaining useful lifetime of a bearing of an electric podded azimuth thruster. The controller comprises an obtain module configured to obtain operational conditions of the bearing. The controller comprises a predict module configured to predict the remaining useful lifetime of the bearing using the operational conditions. The lifetime of the bearing is divided in three separate phases. The remaining useful lifetime of the bearing is predicted differently in the three separate phases.

According to a fourth aspect there is presented a controller for predicting remaining useful lifetime of a bearing of an electric podded azimuth thruster. The controller comprises processing circuitry and a storage medium. The storage medium stores instructions that, when executed by the processing circuitry, causes the controller to perform operations, or steps. The operations, or steps, cause the controller to obtain operational conditions of the bearing. The operations, or steps, cause the controller to predict the remaining useful lifetime of the bearing using the operational conditions. The lifetime of the bearing is divided in three separate phases. The remaining useful lifetime of the bearing is predicted differently in the three separate phases.

Advantageously this provides efficient prediction of remaining useful lifetime of the bearing.

Advantageously the herein disclosed method and controller enable efficient prediction of the RUL for the podded azimuth thruster bearing. Further, the efficient prediction of the RUL can be used as input for efficient prediction of maintenance for the podded azimuth thruster bearing.

Advantageously the herein disclosed method and controller make it possible to minimize the costs for maintenance and avoid unplanned stops through adapting the operational condition for optimal maintenance planning.

According to a fifth aspect there is presented a computer program for predicting remaining useful lifetime of a bearing of an electric podded azimuth thruster, the computer program comprising computer program code which, when run on a controller, causes the controller to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 7A-7B schematically illustrates measured and estimated Fe mass as function of operational time and conditions according to an embodiment;

FIGS. 8A-8B schematically illustrates prediction of fault propagation based on Fe particle counting results from on-going faulty cases according to an embodiment;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In practice the true lifetime of a component is likely to be stochastic in nature. As a result in order to develop proper prognostics methods, large quantities of field data could be required. In many cases, such data is not available. The above-disclosed azimuth thrusters are an exception to this observation; the systems have been well instrumented with condition monitoring equipment and furthermore, a large amount of reliability data is available for analysis. This enables the development of advanced prognostics methods for estimating the remaining lifetime of the bearings.

Figure 1:
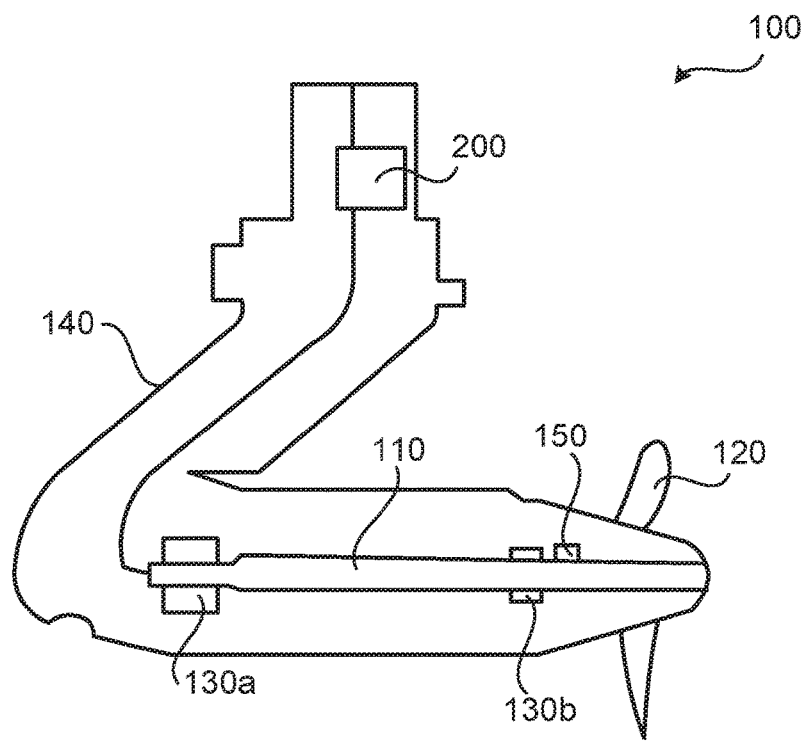
FIG. 1 schematically illustrates an azimuth thruster according to an embodiment.

FIG. 1 is a schematic illustration of an azimuth thruster 100 according to an embodiment. The azimuth thruster 100 is an electric podded azimuth thruster 100 and comprises a propeller shaft no on which propeller blades 120 are provided. The propeller shaft no is supported by at least one bearing 130a, 130b. The interior of the azimuth thruster 100 is enclosed by a water-tight casing, or hull, 140. A controller 200 is provided for predicting remaining useful lifetime of the bearing 130a, 130b and obtains operational conditions of the bearing 130a, 130b as provided by sensors 150.

The embodiments disclosed herein particularly relate to mechanisms for predicting remaining useful lifetime of a bearing 130a, 130b of an electric podded azimuth thruster 100. In order to obtain such mechanisms there is provided a controller 200, a method performed by the controller 200, a computer program product comprising code, for example in the form of a computer program, that when run on a controller 200, causes the controller 200 to perform the method.

Figure 2:
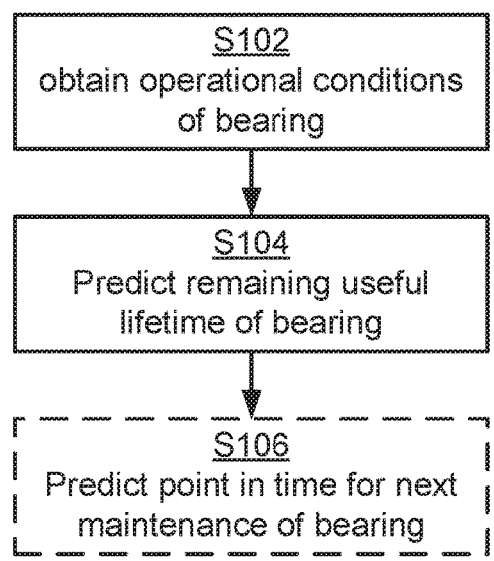
FIG. 2 is a flowchart of methods according to embodiments.

FIG. 2 is a flow chart illustrating embodiments of methods for predicting remaining useful lifetime of a bearing 130a, 130b of an electric podded azimuth thruster 100. The methods are performed by the controller 200. The methods are advantageously provided as computer programs 1220.

The embodiments disclosed herein enable integration of data gathered from different sources around the bearing 130a, 130b to predict the remaining useful lifetime of the bearing 130a, 130b. Hence, the controller 200 is configured to perform step S102:

S102: The controller 200 obtains operational conditions of the bearing 130a, 130b.

Different types of lifetime models could be needed depending on the lifecycle stage of the bearing 130a, 130b as well as different diagnostics methods could be needed to detect the change from one lifecycle stage to another. At least some of the embodiments disclosed herein are based on that before the fault detection, condition monitoring signals and methods do not provide any information that can be used for lifetime modelling of the bearing 130a, 130b whereas after the fault detection the monitoring information can be used to get more accurate predictions. The embodiments disclosed herein are therefore based on dividing the lifetime of the bearing 130a, 130b in three separate phases. Separate models are then used in each phase for predicting the remaining useful lifetime of the bearing 130a, 130b. Hence, the controller 200 is configured to perform step S104:

S104: The controller 200 predicts the remaining useful lifetime of the bearing 130a, 130b using the operational conditions. The lifetime of the bearing 130a, 130b is divided in three separate phases. The remaining useful lifetime of the bearing 130a, 130b is predicted differently in the three separate phases.

Figure 3:
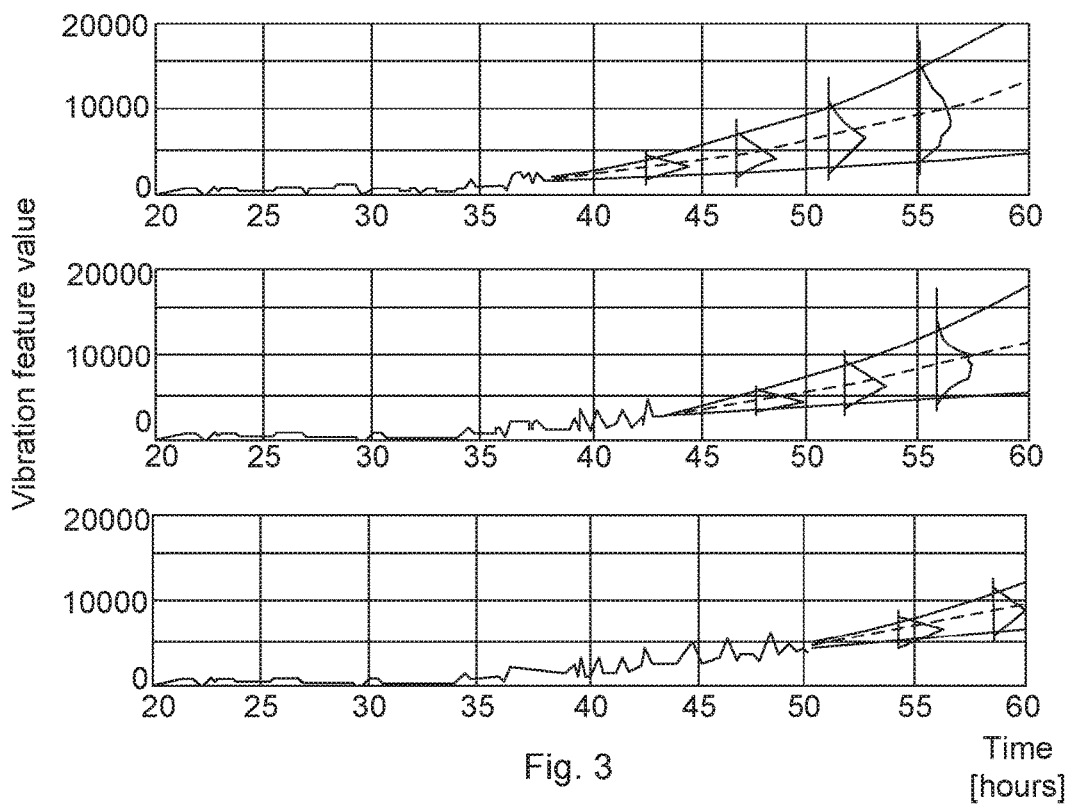
FIG. 3 schematically illustrates remaining useful lifetime prediction according to an embodiment.

This enables a self-adapting and/or self-improving model, which accuracy continuously improves as more data and information is obtained, to be used in the remaining useful lifetime prediction, see FIG. 3 which schematically illustrates the remaining useful lifetime prediction in which accuracy of estimates improves with time.

Embodiments relating to further details of predicting remaining useful lifetime of a bearing 130a, 130b of the electric podded azimuth thruster 100 as performed by the controller 200 will now be disclosed.

The remaining useful lifetime of the bearing 130a, 130b can be predicted using operational data and condition monitoring signals. Hence, according to an embodiment the remaining useful lifetime of the bearing 130a, 130b is predicted using condition monitoring signals. There are different examples of condition monitoring signals. According to an embodiment the condition monitoring signals pertain to at least one of number of metal particles in bearing lubricant, vibration, acoustic emission, and temperature.

There could be different examples of the three separate phases. According to an embodiment the three separate phases include a prehistory phase, a moment of fault detection phase, and faulty bearing phase. The prehistory phase occurs before fault detection. The faulty bearing phase occurs after fault detection.

The period before the fault detection thus starts from the moment when the bearing has been installed and ends at the fault detection. The prehistory data can be modelled based on a Cox proportional hazard function approach applied with a three-parameter Weibull model. That is, according to an embodiment prehistory data is, during the prehistory phase, used to predict the remaining useful lifetime of the bearing 130a, 130b according to a model based on a Cox proportional hazard function approach applied with a three-parameter Weibull model.

The period after the fault detection starts naturally from the fault detection and ends at the bearing failure. The remaining useful lifetime prediction during this period could be based on features extracted from several indicative signals such as vibration signals and oil analysis results. That is, according to an embodiment the prediction of the remaining useful lifetime of the bearing, during the faulty bearing phase, is based on features extracted from several indicative signals such as vibration signals and oil analysis results.

Figure 4:
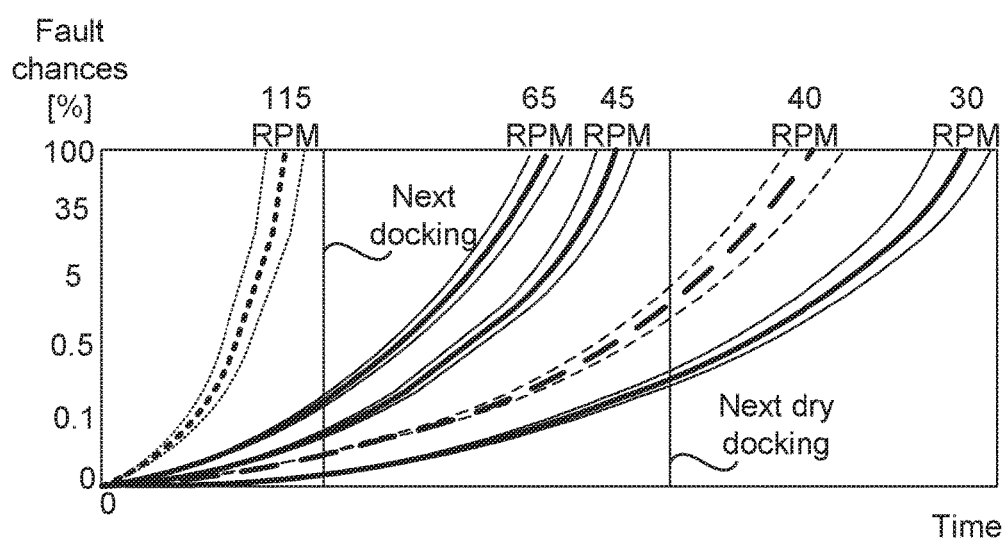
FIG. 4 schematically illustrates estimation of podded azimuth thruster bearing deterioration according to an embodiment.

Predictive maintenance can be used to increase the likelihood of surviving to the next scheduled dry docking, especially in case bearing damage has occurred. Today this issue is solved using data from different sources, analyzed based mainly on expertise knowledge and recommendations. According to embodiments disclosed herein, an accurate estimation of remaining useful life as a function of operational condition, as disclosed above, is used as input for optimizing the maintenance and dry dock planning, including recommendation of the optimal operational condition in order to minimize the risk of unplanned stops with minimum effect on planned operation and time table, see FIG. 4. FIG. 4 shows an illustration of a scenario where the slope of the fault propagation can be affected through changing the rotational speed (measured in rounds per minute; RPM) of the propeller of the electric podded azimuth thruster 100. For each RPM value a margin for the fault chances are given. For each RPM value the margin increases as the time increases.

Hence, according to an embodiment the controller 200 is configured to perform step S106:

S106: The controller 200 selects point in time for a next maintenance of the bearing 130a, 130b using the predicted remaining useful lifetime of the bearing 130a, 130b. This is possible through adapting the operational speed in a way to optimize the remaining useful life of the bearing 130a, 130b in such a way that the next possible/planned dry-docking/scheduled maintenance break always can be reached.

Further aspects applicable to the above embodiments for predicting remaining useful lifetime of a bearing 130a, 130b of the electric podded azimuth thruster 100 as performed by the controller 200 will now be disclosed.

Figure 5:
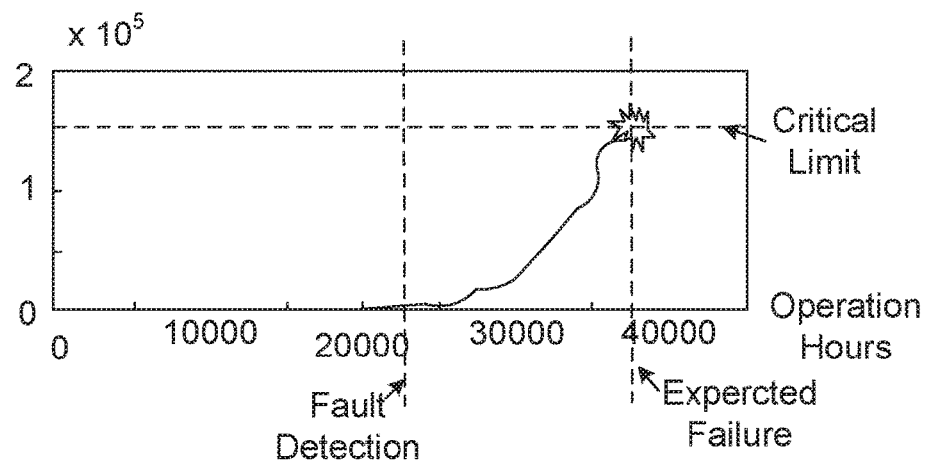
FIG. 5 schematically illustrates division of lifetime modelling into two periods according to an embodiment.

Fault detection divides the lifetime modelling into two periods. FIG. 5 is an illustration of this approach. A first model is developed to predict the remaining useful lifetime of the bearing 130a, 130b during a normal condition period (before fault detection) based on failure history when condition monitoring (CM) methods do not indicate fault. A second model is developed to predict the remaining useful lifetime of the bearing 130a, 130b based on different measurements and analysis such as oil analysis results, vibration measurements, acoustic emission etc. during the period when the condition monitoring methods indicate fault. The first model and the second model are then combined. Before the fault detection the model is calibrated based on failure history.

Aspects of a model based on failure history will now be disclosed According to an example there is provided a 3-parameter proportional hazard rate model comprising a baseline hazard rate $h_0(t)$ and a functional term $p(P_r)$ that includes vector of covariates (rated power).

The Hazard rate mode is defined as follows:

$$h(t, P_r) = \rho(P_r)h_0(t) = \rho(P_r)\frac{\beta}{\alpha}\left(\frac{t-\eta}{\alpha}\right)^{\beta-1}$$

The corresponding probability density function is:

$$f(t, P_r) = h(t, P_r)\exp\left(\int_0^t h(\tau, P_r)d\tau\right)$$

where the functional term is defined as a function of the operational parameter rated power $P_r$, and where $$p(P_r) = \exp(b_2 P_r^2 + b_1 P_r - b_0)$$

Figure 6:
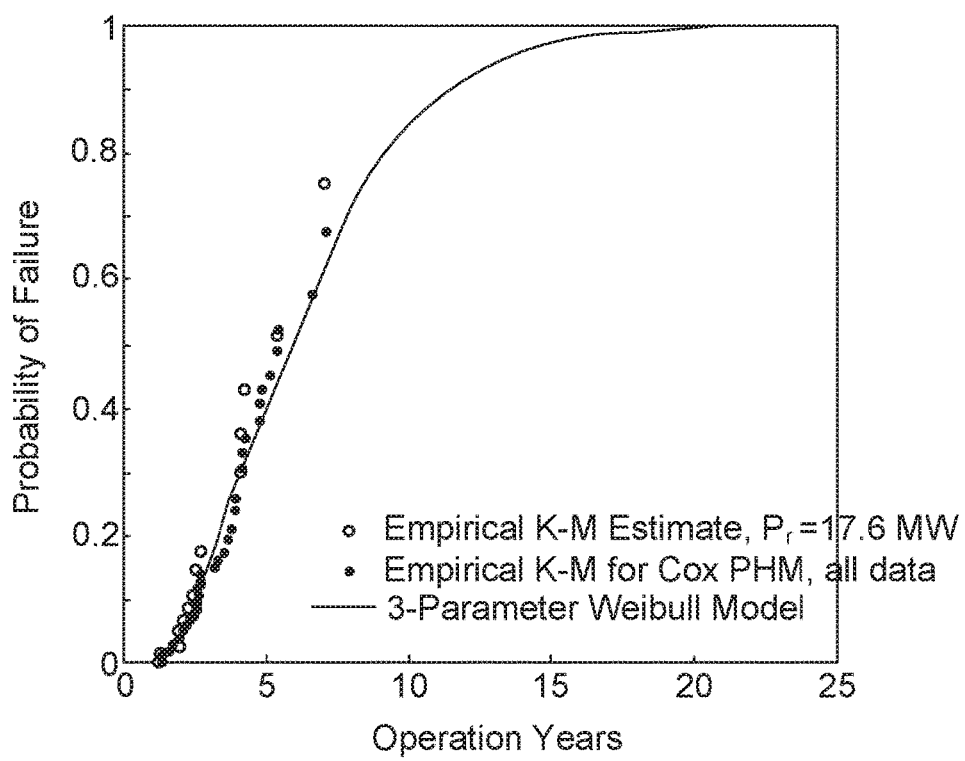
FIG. 6 schematically illustrates a comparison between cumulative probability distribution based on history data compared to a predicted model according to an embodiment.

FIG. 6 shows a comparison between cumulative probability distribution based on history data compared to the predicted Hazard model.

This model is then used for estimation of remaining useful life in order to optimize the overall maintenance planning or other purposes.

The RUL at time t then is calculated as:

$$E[\mu(t)] = \frac{\int_t^\infty (\tau - t)f(\tau, P_r)d\tau}{\int_t^\infty f(\tau, P_r)d\tau}$$

Aspects of predicting RUL based on oil analysis will now be presented. Consider a state space type of model:

$$\begin{cases} x_k = r_k(x_{k-1}, \zeta_k) \\ z_k = g_k(x_k, \xi_k) \end{cases}$$

where $r_k$ is the k:th state function and $g_k$ is the measurement function.

According to an embodiment the state function is a cumulative damage function x[k] that depends on operational data and is defined as:

$$x[k+1] = x[k] + \underbrace{r[k](t[k+1] - t[k])}_{\approx \text{Number of impacts during the period } [t(k-1), t(k)]} \underbrace{P[k]^2}_{\approx \text{Energy of impacts}}$$

where r is the rotation speed, where t is the number of operation hours, and where P is the power.

The measurement function corresponds to the counted number of Fe particles in the oil, which is described as an exponential function of the cumulative damage; $F_i[k] = e^{a_{i,0} + a_{i,1} x[k]}$, where $a_{i,0}$ and $a_{i,1}$ are stochastic parameters.

The two examples in FIGS. 7(a) and (b) show how well the model captures the effect of the operational conditions. The third axis in FIGS. 7(a) and (b) depicts the actual used power. The propagation of the fault decreases with the decreased use of power.

Thus the remaining useful life is estimated using predicted operational data and the state equation. In order to quantify the limitation for the slope of the fault propagation curve, the time until next upcoming maintenance versus a maximum size of Fe particle is used, see FIG. 8. FIG. 8 illustrates the prediction of fault propagation based on Fe particle counting results from on-going faulty cases. In this case the corresponding mass of maximum tolerated number of counted particles is around 150 000 mg. The confidence interval for the prediction is included in FIG. 8(b).

Aspects of the vibration signal will now be disclosed. As it is appears from the described approach the detection of the very moment of the fault is of importance for the precision of the model at hand. Using the vibration signal increases the reliability of the model due to earlier detection of appearance of the fault than using particle counting in the oil.

Additionally use of the vibrational signal can improve the RUL model based on particle counting. Although particle counting is one of the most reliable ways of estimating the severity of the fault, in many scenarios particle counting is not available or too costly, and therefore a calibrated RUL model based on a variety of signals will enrich the precision of remaining useful lifetime models.

Figure 9:
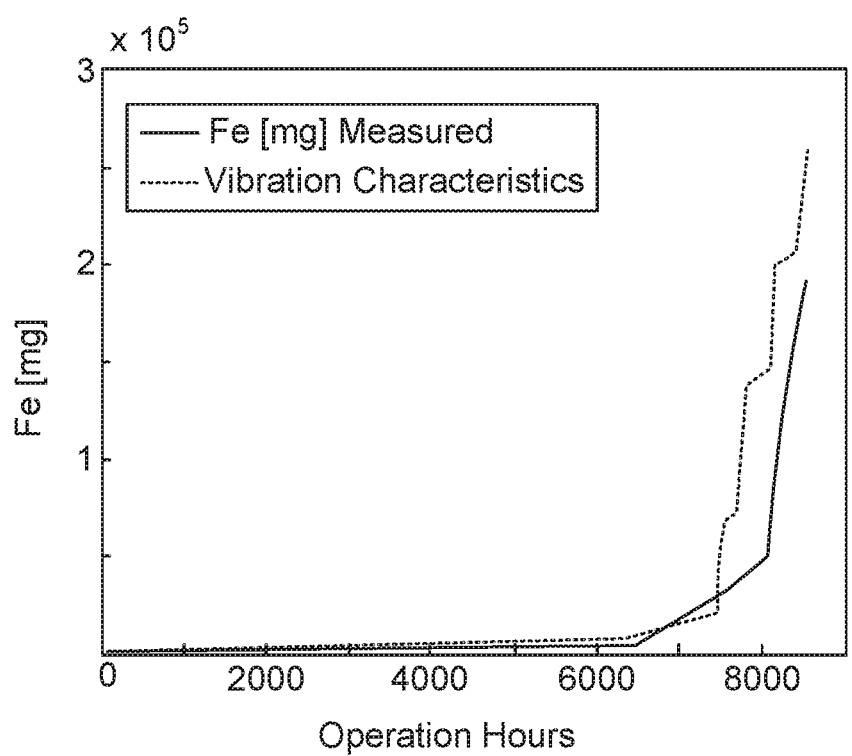
FIG. 9 schematically illustrates the correlation between the fault propagation prediction based on vibration as well as particle counting models according to an embodiment.

FIG. 9 shows the correlation between the fault propagation prediction based on vibration as well as particle counting according to an illustrative example. In this illustrative example the fault was detected using the vibration signals one month before the generation of metal particles due to the fault in the lubricant. The changes of the slope of the propagation function are captured much earlier using vibration characteristics.

The vibration characteristics in this illustrative example are extracted using the energy of the impulses generated by fault in the bearing, where the impulses are properly scaled and integrated. Thus in order to have a reliable RUL method it could be beneficial to combine different indicators; particle counting for its capability to estimate the severity of the fault and vibration to capture different phases of growth early. Adding additional signals to already developed model could increase even more the reliability of the prediction. Here methods based on machine learning (ML) can be of use.

Figure 10:
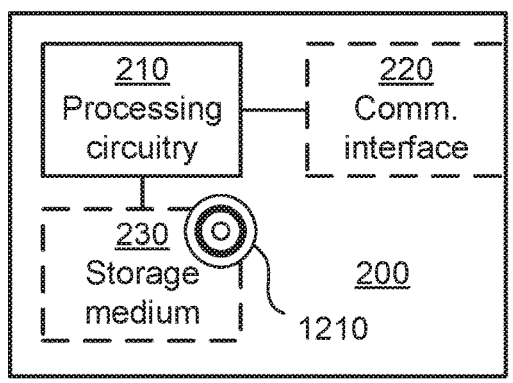
FIG. 10 is a schematic diagram showing functional units of a controller according to an embodiment.

FIG. 10 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, S102-S106, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with sensors 150. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 11:
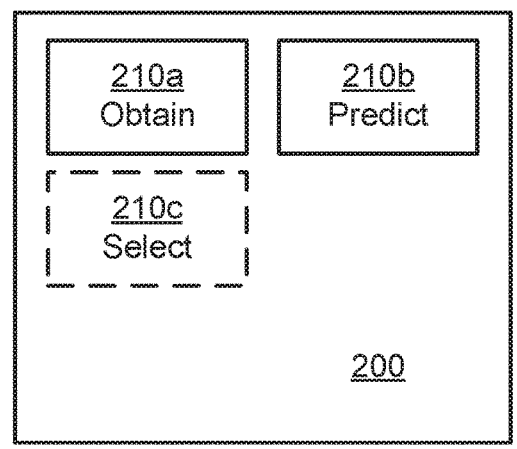
FIG. 11 is a schematic diagram showing functional modules of a controller according to an embodiment.

FIG. 11 schematically illustrates, in terms of a number of functional modules, the components of a controller 200 according to an embodiment. The controller 200 of FIG. 11 comprises a number of functional modules; an obtain module 210a configured to perform step S102, and a predict module 210b configured to perform step S104. The controller 200 of FIG. 11 may further comprise a number of optional functional modules, such as a select module 210c configured to perform step S106. In general terms, each functional module 210a-210c may in one embodiment be implemented only in hardware or and in another embodiment with the help of software, i.e., the latter embodiment having computer program instructions stored on the storage medium 230 which when run on the processing circuitry makes the controller 200 perform the corresponding steps mentioned above in conjunction with FIG. 2. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with functional units 220 and/or 230. The processing circuitry 210 may thus be configured to from the storage medium 230 fetch instructions as provided by a functional module 210a-210c and to execute these instructions, thereby performing any steps as disclosed herein.

The controller 200 may be provided as a standalone device or as a part of at least one further device. For example, the controller 200 may be provided in the azimuth thruster 100. Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 10 the processing circuitry 210 may be distributed among a plurality of devices, or nodes. The same applies to the functional modules 210a-210c of FIG. 11 and the computer program 1220 of FIG. 12.

Figure 12:
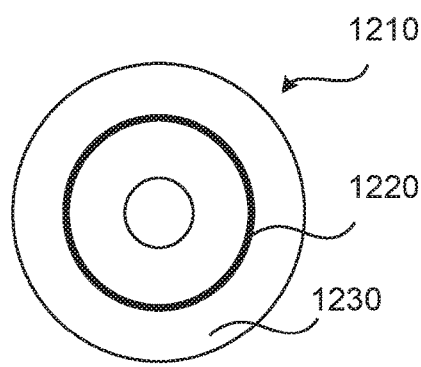
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for predicting remaining useful lifetime of a bearing of an electric podded azimuth thruster, the method being performed by a controller, the method comprising:
   obtaining operational conditions of the bearing; and
   predicting the remaining useful lifetime of the bearing using the operational conditions, wherein the lifetime of the bearing is divided in three separate phases, and wherein the remaining useful lifetime of the bearing is predicted differently in the three separate phases.

2. The method according to claim 1, wherein the remaining useful lifetime of the bearing is predicted using condition monitoring signals.

3. The method according to claim 1, wherein the condition monitoring signals pertain to at least one of number of metal particles in bearing lubricant, vibration, acoustic emission, and temperature.

4. The method according to claim 1, wherein the three separate phases include a prehistory phase, a moment of fault detection phase, and faulty bearing phase.

5. The method according to claim 4, wherein the prehistory phase occurs before fault detection.

6. The method according to claim 4, wherein the faulty bearing phase occurs after fault detection.

7. The method according to claim 4, wherein, during the prehistory phase, prehistory data is used to predict the remaining useful lifetime of the bearing according to a model based on a Cox proportional hazard function approach applied with a three-parameter Weibull model.

8. The method according to claim 4, wherein, during the faulty bearing phase, the prediction of the remaining useful lifetime of the bearing is based on features extracted from vibration signals and/or oil analysis results.

9. The method according to claim 1, further comprising:
   selecting point in time for a next maintenance of the bearing using the predicted remaining useful lifetime of the bearing.

10. A controller for predicting remaining useful lifetime of a bearing of an electric podded azimuth thruster, the controller comprising processing circuitry, the processing circuitry being configured to cause the controller to:
    obtain operational conditions of the bearing; and
    predict the remaining useful lifetime of the bearing using the operational conditions, wherein the lifetime of the bearing is divided in three separate phases, and wherein the remaining useful lifetime of the bearing is predicted differently in the three separate phases.

11. The controller according to claim 10, wherein the processing circuitry is configured to cause the controller to:
    predict point in time for a next maintenance of the bearing using the predicted remaining useful lifetime of the bearing.

12. A controller for predicting remaining useful lifetime of a bearing of an electric podded azimuth thruster, the controller comprising:
    an obtain module configured to obtain operational conditions of the bearing; and
    a predict module configured to predict the remaining useful lifetime of the bearing using the operational conditions, wherein the lifetime of the bearing is divided in three separate phases, and wherein the remaining useful lifetime of the bearing is predicted differently in the three separate phases.

13. The controller according to claim 12, further comprising:
    a predict module configured to predict point in time for a next maintenance of the bearing using the predicted remaining useful lifetime of the bearing.

14. A computer program stored in a non-transitory computer readable storage medium, the computer program configured for predicting remaining useful lifetime of a bearing of an electric podded azimuth thruster, the computer program comprising computer code which, when run on processing circuitry of a controller, causes the controller to:
    obtain operational conditions of the bearing; and
    predict the remaining useful lifetime of the bearing using the operational conditions, wherein the lifetime of the bearing is divided in three separate phases, and wherein the remaining useful lifetime of the bearing is predicted differently in the three separate phases.

15. A computer program product comprising the computer program according to claim 14, and a non-transitory computer readable storage medium on which the computer program is stored.

* * * * *